No. 849,409. PATENTED APR. 9, 1907.
K. MARTIN.
TELESCOPE, FIELD GLASS, AND THE LIKE.
APPLICATION FILED JAN. 31, 1906.
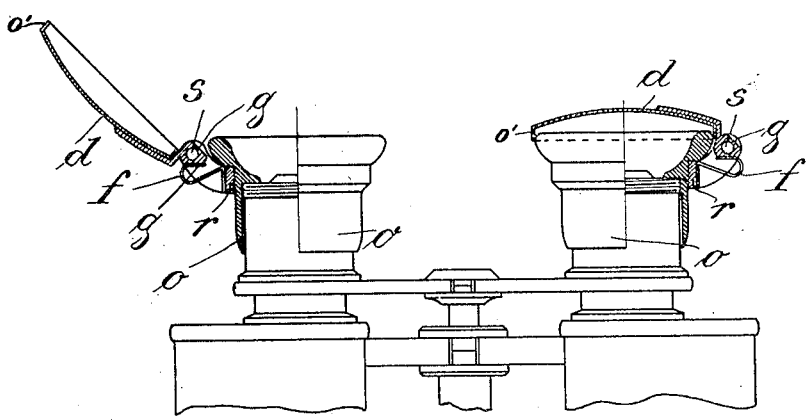

UNITED STATES PATENT OFFICE.

KARL MARTIN, OF RATHENOW, GERMANY, ASSIGNOR TO THE FIRM OF RATHENOWER OPTISCHE INDUSTRIE-ANSTALT VORMALS EMIL BUSCH, A. G., OF RATHENOW, GERMANY.

TELESCOPE, FIELD-GLASS, AND THE LIKE.

No. 849,409.      Specification of Letters Patent.      Patented April 9, 1907.

Application filed January 31, 1906. Serial No. 298,855.

*To all whom it may concern:*

Be it known that I, KARL MARTIN, a subject of the King of Prussia, German Emperor, and a resident of Rathenow, in the Province of Brandenburg, German Empire, have invented certain new and useful Improvements in Telescopes, Field-Glasses, and the Like, of which the following is an exact specification.

This invention relates to telescopes, field-glasses and the like, and more especially to binoculars, and has for its purpose to provide protecting-covers for the eyepieces.

When telescopes or binoculars are carried in the open air on the person, they are open to the objection that the lenses or the eye-pieces are liable to be soiled by rain, beads of moisture or perspiration, dust, and the like. A smooth and clean cloth is not always at hand for cleaning the lenses, and, furthermore, time is lost by this manipulation, which is very disadvantageous when telescopes or binoculars are used for military shooting or for sporting purposes. Hitherto attempts have been made to remove this defect by covering the lenses of the eyepieces of field-glasses with leather covers loosely mounted on the eyepieces. This arrangement does not fit closely and is cumbersome when using the glass, owing to the leather covers hanging in front of the face of the spectator.

By this present invention a good protection for the eyepieces is obtained without enlarging the dimensions of the telescope, and at the same time the lateral rays of light are prevented from entering the eye, which is an additional advantage.

In order to make the invention clear, reference is made to the accompanying drawing, which is partly in elevation and partly in sectional elevation.

On the left-hand side of the drawing the protecting-cover is shown opened and on the right-hand side it is shown folded down.

In the figure, $o$ $o$ are the eyepieces of a binocular telescope, and each eyepiece is provided with a ring $r$, mounted thereon, which ring has hinged thereto a cover $d$ by means of the hinge $s$. The circular edge of the cover is rectangularly turned off as to encircle the edge $o'$ of the eyepiece, thereby effectively preventing the rain and the like from entering the inner of the eyepiece. Furthermore, due to the projecting edge of the cover, its opening is facilitated. The ring $r$ in each case has fixed thereto a spring $f$, which with its free end presses against the flattened parts $g$ of the hinge when the cover is opened or folded down, thereby insuring that the cover shall remain in either the open or closed position. From the left-hand side of the figure it will be seen that the cover in its opened position protects the eye against lateral rays.

Having thus fully described the nature of my invention, what I desire to secure by Letters Patent of the United States is—

In telescopes, field-glasses and the like, the combination with eyepieces, of protecting-covers, attached to the eyepieces by flattened hinge members and having their edges rectangularly turned off, for encircling the outer edge of the eyepieces, and of a spring pressing with one end against the flattened hinge member of the cover insuring thereby the retention of the covers in their opened or closed position, for the purpose of preventing the eyepieces from being soiled, and protecting the eye of the observer against lateral rays.

In witness whereof I have hereunto set my hand in the presence of two witnesses.

KARL MARTIN.

Witnesses:
   WOLDEMAR HAUPT,
   HENRY HASPER.